(12) United States Patent
Kirkpatrick

(10) Patent No.: US 7,124,742 B1
(45) Date of Patent: Oct. 24, 2006

(54) SUPPLEMENTAL FUEL INJECTOR TRIGGER CIRCUIT

(75) Inventor: William E. Kirkpatrick, Bozeman, MT (US)

(73) Assignee: Techlusion Corporation, Belgrade, MT (US)

(*) Notice: Subject to any disclaimer, the term of this patent is extended or adjusted under 35 U.S.C. 154(b) by 0 days.

(21) Appl. No.: 11/265,561

(22) Filed: Nov. 2, 2005

Related U.S. Application Data (63) Continuation of application No. 11/034,186, filed on Jan. 12, 2005, now Pat. No. 7,000,599.

(60) Provisional application No. 60/591,199, filed on Jul. 26, 2004, provisional application No. 60/616,598, filed on Oct. 6, 2004, provisional application No. 60/637,858, filed on Dec. 21, 2004.

(51) Int. Cl.
*F02M 51/00* (2006.01)
*F02M 1/00* (2006.01)

(52) U.S. Cl. ............................. 123/490; 361/152

(58) Field of Classification Search ............ 123/490; 361/152, 154, 155
See application file for complete search history.

(56) References Cited

U.S. PATENT DOCUMENTS

| | | | |
|---|---|---|---|
| 4,209,829 A | 6/1980 | Leichle |
| 4,355,619 A | 10/1982 | Wilkinson |
| 4,499,878 A | 2/1985 | Igashira et al. |
| 4,649,886 A | 3/1987 | Igashira et al. |
| 5,515,830 A | 5/1996 | Arakawa |
| 5,941,216 A | 8/1999 | Arakawa |
| 5,954,030 A | 9/1999 | Sturman et al. |
| 6,005,763 A | 12/1999 | North |
| 6,102,008 A | 8/2000 | Maeda et al. |
| 6,286,492 B1 | 9/2001 | Kanno |
| 6,923,163 B1 | 8/2005 | Yamazaki |

*Primary Examiner*—John T. Kwon
(74) *Attorney, Agent, or Firm*—MacMillan, Sobanski & Todd, LLC

(57) ABSTRACT

A Supplemental Fuel Injector Control Circuit includes a resistor adapted to connected between a voltage output port and an injector control port of an Engine Control Unit. The circuit also includes a diode having a cathode adapted to be connected to the injector control port and an anode adapted to be connected to both an end of a fuel injector coil and to an Auxiliary Fuel Injector Controller. The circuit is operable to allow modification of fuel injector cycle duration while preventing generation of an error code by the Engine Control Unit.

18 Claims, 10 Drawing Sheets

SUPPLEMENTAL FUEL INJECTOR TRIGGER CIRCUIT

CROSS-REFERENCE TO RELATED APPLICATIONS

This application is a continuation of U.S. application Ser. No. 11/034,186, filed Jan. 12, 2005, now U.S. Pat. No. 7,000,599 which claims the benefit of U.S. Provisional Application Nos. 60/591,199, filed Jul. 26, 2004, 60/616,598, filed Oct. 6, 2004, and 60/637,858, filed Dec. 21, 2004. The disclosures of all of the applications are incorporated herein by reference.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

This invention relates in general to circuits for controlling fuel injectors for vehicle engines and in particular to a supplemental fuel injector control circuit.

Figure 1:
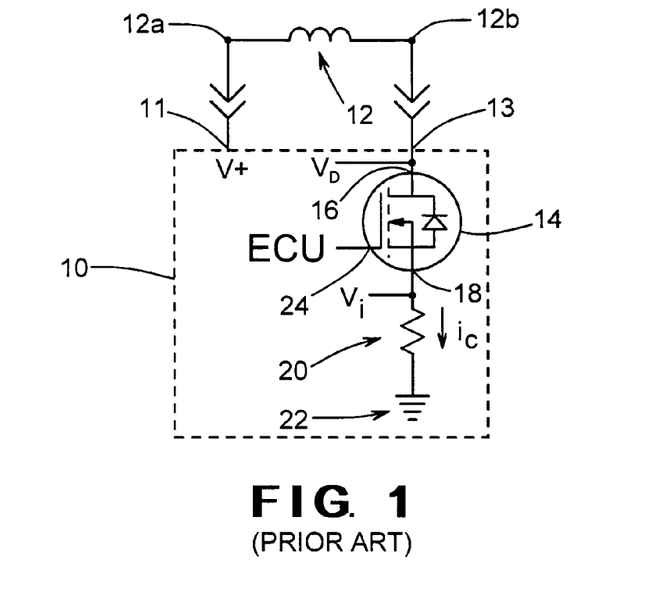
FIG. 1 is a prior art fuel injector control circuit.

Fuel injection provides carefully controlled metering of fuel supplied to a vehicle engine. The careful control of fuel supply enhances engine performance and mileage while reducing harmful emissions. Referring now to the drawings, there is shown in FIG. 1 a typical known circuit for controlling a fuel injector valve. The circuit includes an Engine Control Unit (ECU) 10 having a voltage output port 11 that provides a voltage V+ connected to a high end 12a of a fuel injector coil 12. The other, or low, end 12b of the injector coil 12 is connected to an ECU injector control port 13. The ECU 10 includes an electronic switch which is shown in FIG. 1 as an injector Field Effect Transistor (FET) 14. While an FET is shown in FIG. 1, the electronic switch could be any other device that is capable of handling the coil current. The injector FET 14 has a drain terminal 16 connected through the injector control port 13 to the coil low end 12b and a source terminal 18 connected through a small current sensing resistor 20 to ground 22. The injector FET 14 also has a gate terminal 24 that is normally connected to ground, causing the FET 14 to be in a non-conducting state and thereby blocking any current flow through the injector coil 12.

When engine conditions require an injection of fuel, a voltage is applied to the injector FET gate terminal 24, causing the FET 14 to switch to a conducting state. As the injector FET conducts, the low end 12b of the injector coil 12 is connected through the current sensing resistor 20 to ground 22 allowing a current $i_c$ to flow through the coil that causes the injector to open and supply a charge of fuel to an associated engine cylinder. When fuel is no longer needed, the injector FET gate terminal 24 is returned to ground, switching the FET 14 back to a non-conducting state and interrupting the current $i_c$ supplied to the injector coil 12. Upon interruption of the injector coil current, the injector closes, terminating the supply of fuel to the engine cylinder. The voltage $V_t$ across the sensing resistor 16 is proportional to the current passing through the injector coil 12 and is fed back to the ECU 10 for monitoring the operation of the injector. Also, the ECU 10 monitors the drain terminal voltage $V_D$ to assure that the injector and the injector FET 14 are operating correctly. When the injector FET 14 is in its non-conducting state with the injector closed, the drain terminal voltage $V_D$ is equal to the voltage $V_+$ appearing at the ECU voltage output port 11. When the injector FET 14 is in its conducting state with the injector open, the drain terminal 16 is effectively connected to ground 22 and the drain terminal voltage $V_D$ is approximately equal to zero. While one injector coil 12 is shown in FIG. 1, a similar circuit is provided for each of the engine cylinders.

Figure 2:
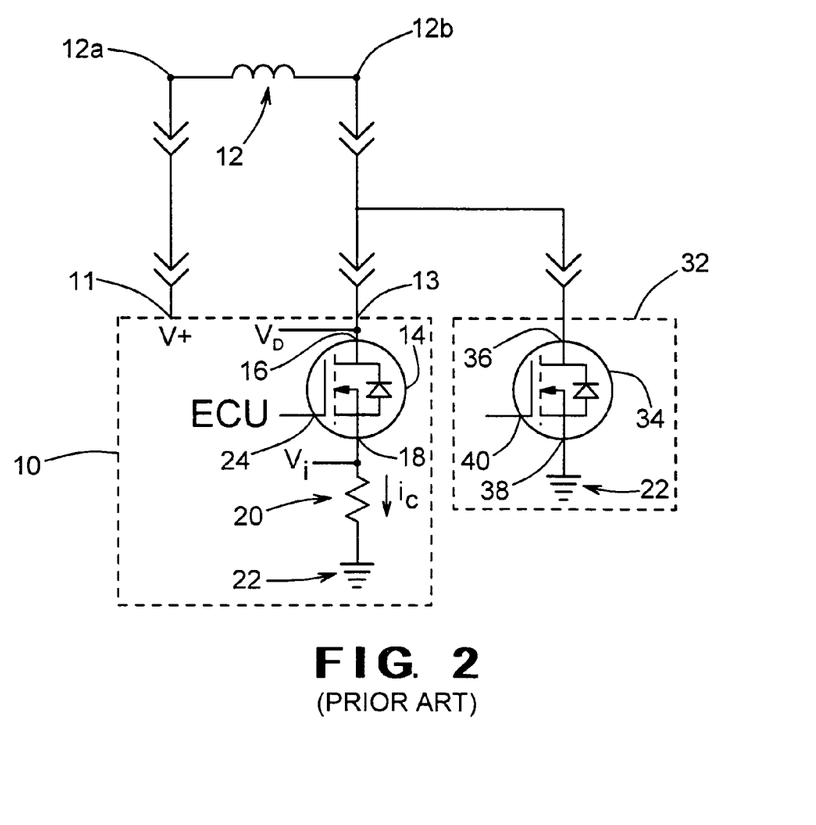
FIG. 2 illustrates an Auxiliary Injector Controller connected to the circuit shown in FIG. 1.

When modifications are made to a vehicle engine, such as replacing the exhaust system, the stock ECU 10 no longer provides the correct fuel amount across the engine's operating range. As most modifications improve air flow, the resulting fuel/air mixture is typically lean in certain conditions. As illustrated in FIG. 2, it is known to connect an Auxiliary Fuel Injector Controller (AIC) 32 to the low end 12b of the fuel injector coil 12 to provide additional fuel to correct the lean condition by extending the time period that the injector is open. Components shown in FIG. 2 that are similar to components shown in FIG. 1 have the same numerical identifiers. The AIC 32 includes a second FET 34 as an electronic switch with a drain terminal 36 connected to the low end 12b of the fuel injector coil 12 and a source terminal 38 connected directly to ground 22. When in its conducting state, the AIC FET 34 provides an alternate path to ground for the injector coil current and thus keeps the injector open. While an FET is shown in FIG. 2, the electronic switch could be any other device that is capable of handling the coil current. During operation, when the injector FET 14 in the ECU 10 is switched to its non-conducting state, a control voltage can be applied to the gate terminal 40 of the second FET 34 in the AIC 32 to keep the injector open.

Although less common, some modifications such as cam replacement, cause a rich condition requiring the AIC to remove fuel under certain conditions by reducing the time period that the injector is open. For example, an AIC FET could be inserted in series with the injector FET 14 to interrupt the current being supplied to the injector coil before the ECU would normally switch the injector FET 14 to its non-conducting state (not shown).

ECUs are becoming increasingly sophisticated, providing advanced diagnostic capabilities to detect problems within the system. Certain ECUs monitor the voltage and/or current to the fuel injector to determine if the injector and injector controller are operating properly by comparing the duration and magnitude of the coil current flow and duration and magnitude of the change in drain voltage to acceptable operating ranges for the parameters. Adding an AIC to these ECUs can cause the actual time duration and/or magnitude of each monitored parameter to fall outside of the acceptable range. For example, when the second FET 34 in the AIC 32 holds the injector open longer to correct lean fuel air mixture, the low end 12b of the injector coil 12 is pulled to ground. Thus, even though the ECU injector FET 14 is not conducting, its drain terminal voltage $V_D$ is zero, as if the FET 14 were conducting. As described above, the drain voltage $V_D$ is monitored by the ECU 10 which will erroneously conclude that the ECU injector FET 14 is still conducting and will generate an engine error code, indicating a fault in the injection circuit. Accordingly it would be desirable to provide a circuit that would allow operation of the AIC without triggering ECU error messages.

BRIEF SUMMARY OF THE INVENTION

This invention relates to a supplemental fuel injector control circuit.

The present invention contemplates a circuit that includes a resistor adapted to connected between a voltage output port and an injector control port of an Engine Control Unit. The circuit also includes a diode having a cathode adapted to be connected to the injector control port and an anode adapted to be connected to both an end of a fuel injector coil and to an Auxiliary Fuel Injector Controller. The resistor and diode co-operate to allow changing the duration of the fuel injector on-time without the Engine Control Unit generating a false error code.

The invention also contemplates including an electronic switch in the circuit that is operable to change the duration of the fuel injector on-time to improve engine performance. For lengthening the duration of the injector on-time, the electronic switch is connected between diode cathode and ground while for shortening the duration of the injector on-time, the electronic switch is connected between the diode cathode and the injector control port.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 3:
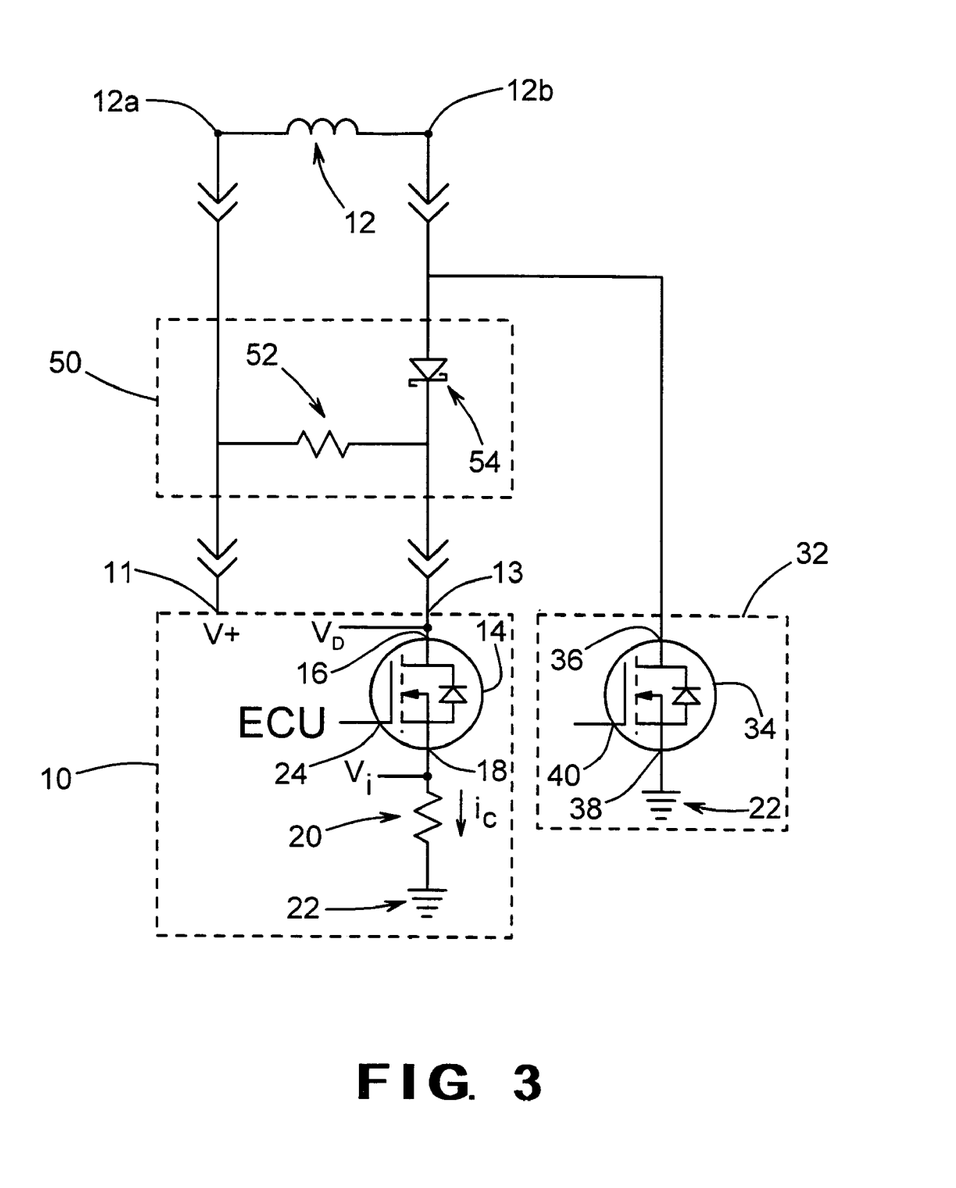
FIG. 3 is a supplemental fuel injector control circuit for adding fuel in accordance with the invention.

Referring again to the drawings, there is illustrated in FIG. 3 a Supplemental Fuel Injection Trigger Circuit (SFITC) 50 for fuel addition that is in accordance with the present invention. Components shown in FIG. 3 that are similar to components shown in FIG. 1 have the same numerical identifiers. The SFITC 50 supplements an AIC 32 and is connected between the injector coil 12 and the ECU 10. The SFITC 50 includes a connecting resistor 52 connected across the voltage output port 11 and the injector control port 13 of the ECU 10. The supplemental circuit 50 also includes a diode 54 that has a cathode connected to the ECU injector control port 13 and an anode connected to both the low end 12b of the injector coil 12 and the drain terminal 36 of the AIC FET 34. In the preferred embodiment, the diode 54 is a schottky barrier rectifier; however, any rectifier device capable of handling the current and voltage also may be utilized in the circuit. While one supplemental circuit 50 is shown in FIG. 3, a similar circuit is provided for each of the engine cylinders.

The operation of the supplemental trigger circuit 50 will now be described for correction of a lean fuel/air mixture. Initially, the AIC FET 34 is off, blocking any coil current flow through the AIC 32. When the ECU injector FET 14 turns on, the diode 54 is forward biased and coil current $i_c$ flows through the injector coil 12 and the diode 54 to ground 22 causing the injector to open. Both the ECU injector FET drain voltage $V_D$ and the coil current $i_c$, as determined from the voltage $V_i$ across the current sensing resistor 20, will be nearly identical to the voltage and current that exist when the low end 12b of the injector coil 12 is connected directly to the injector control port 13, as shown in FIGS. 1 and 2. This is especially true in the preferred embodiment where the diode 54 is a schottky barrier rectifier with a very low forward voltage drop. When the ECU 10 switches the injector FET 14 to its non-conducting state to close the injector, no current flows and the associated FET drain voltage $V_D$ will be pulled to the V+ voltage, again making the voltage and current appear as if the low end 12b of the injector coil 12 were directly connected to the injector FET drain terminal 16. With the ECU off, the AIC 32 can reopen the injector by switching the AIC FET 34 to its conducting state, providing an alternate path to ground 22 for the coil current $i_c$ and causing an additional fuel to flow to correct the lean condition. However, when the AIC FET 34 is conducting, its drain terminal 36 pulls the cathode of the diode 54 to ground, reverse biasing the diode. Because the diode 54 is reverse biased during this condition, no current flows through the connecting resistor 52. As a result, the voltage sensed at the ECU injector FET drain terminal 16 remains at the voltage output port value of V+ and the current through the current sensing resistor 20 remains zero, just as they were when the injector FET 14 stopped conducing. Accordingly, the injector will appear to be closed and the ECU 10 will not generate an error code. While the preferred embodiment of the invention has been described with the AIC FET 34 being switched to its conducting state after the injector FET 14 turns off, it will be appreciated that the invention also will operate if the AIC FET 34 is switched on when the FET 14 is turned off, or if the AIC FET 34 is switched on just before the FET 14 is turned off, provided that ECU operating parameters are met.

Figure 4:
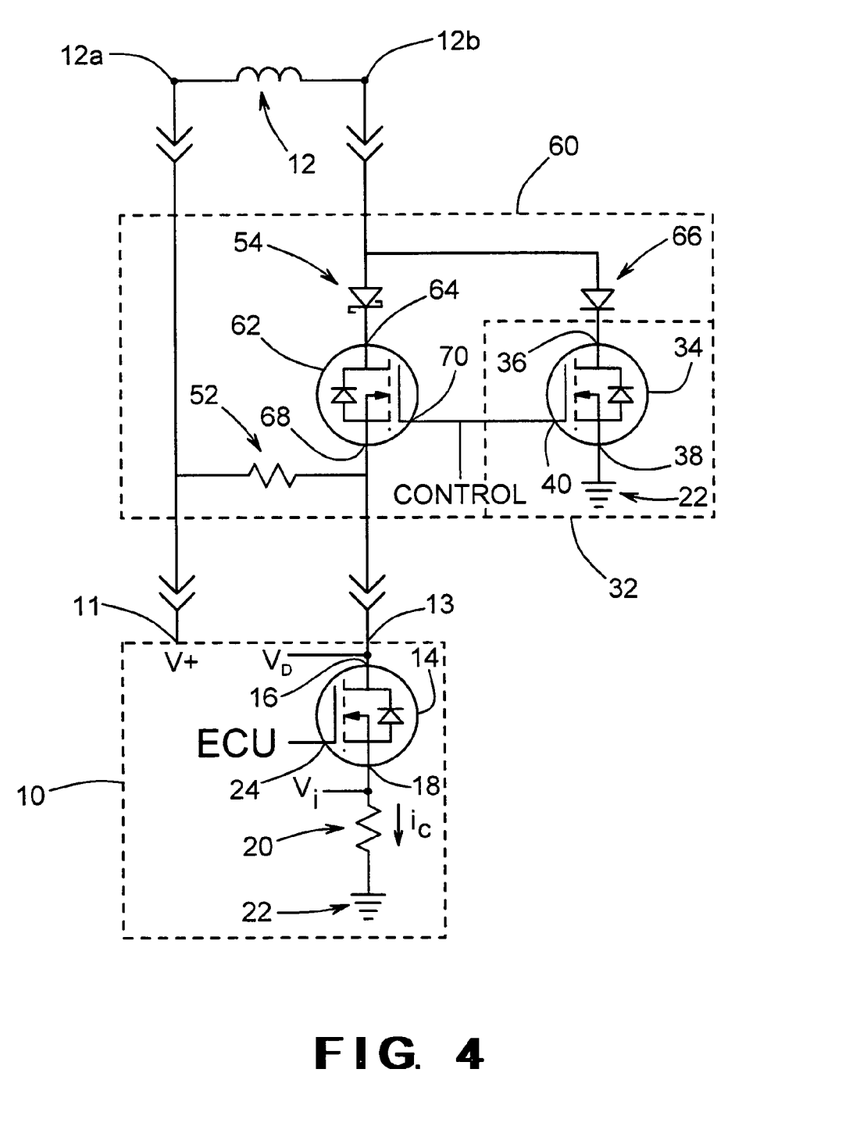
FIG. 4 is an alternate embodiment of the circuit shown in FIG. 3 for either adding or removing fuel.

An alternate embodiment 60 of the Supplemental Fuel Injection Trigger Circuit that may be used for either Fuel Removal or Addition is shown in FIG. 4. As before, components shown in FIG. 4 that are similar to components shown in FIGS. 1 through 3 have the same numerical identifiers. Similar to the circuit shown in FIG. 3, The SFITC 60 supplements an AIC 32 and is connected between the injector coil 12 and the ECU 10. Similar to the circuit shown in FIG. 3, the supplemental circuit 60 includes a resistor 52 connected across the voltage output port 11 and the injector control port 13 of the ECU 10. The alternate circuit 60 also includes a third electronic switch, shown as an FET 62. While an FET is shown in FIG. 4, the third electronic switch also could be any other device that is capable of handling the injector coil current. The third FET 62 has a drain terminal 64 connected to the cathode of a first diode 54. The first diode 54 also has an anode connected to both the low end 12b of the injector coil 12 and the anode of a second diode 66. The cathode of the second diode is connected to the drain terminal 36 of the AIC FET 34. As depicted, in the preferred embodiment, the first diode 54 is again a schottky barrier rectifier while the second diode 66 is a conventional silicon rectifier having a higher forward voltage drop than the first diode 54; however, any rectifier devices may be used for the diodes as long as the second device has a higher forward voltage drop than the first device. Additionally, the invention contemplates using other devices in place of the single second diode 66 shown to produce the higher forward voltage drop. For example, the invention also may be practiced with a pair of series connected diodes (not shown) in the place of the second diode 66. Returning to the third FET 64, the FET also has a source terminal 68 connected both to the drain terminal of the ECU injector FET 14 and one end of the resistor 52. The third FET 62 further has a gate terminal 70 connected to the AIC FET gate terminal 40, causing both FETs 34 and 62 to be either conducting or non-conducting at the same time in response to a control signal. In the preferred embodiment, the control signal is generated by a conventional timer circuit (not shown) that is triggered by the ECU 10 when the ECU injector FET 14 is switched to its conducting state. The timer circuit is calibrated for the specific engine modification. Alternately, the control signal may be generated by a microprocessor (not shown), an Applied Specific Integrated Circuit (ASIC) (not shown), or another similar device. While one supplemental circuit 50 is shown in FIG. 4, a similar circuit is provided for each of the engine cylinders.

The operation of the alternate circuit 60 will now be described with lengthening of the fuel injection duration described first. To lengthen the fuel injection duration, a voltage is applied to gate terminals 40 and 70 of both the AIC FET 34 and the third FET 64 to place both FET's into their conducing states. When both the AIC FET 34 and the third FET 64 are in their conducting states, the path of coil current flow will be dependent on the condition of the ECU injector FET 14. If the injector FET 14 is conducting, the coil current $i_c$ will flow through the third FET 62 and the first diode 54, as described above. Due to the higher voltage drop across the second diode 66, very little current will flow through the AIC FET 34 and the first diode 54 will be forward biased. Therefore, virtually all of the current through the injector coil 12 also passes through the ECU injector FET 14 and the drain terminal voltage $V_D$ and the sensing resistor voltage $V_i$ are approximately the same as would occur without the supplemental circuit 60. Accordingly, the ECU 10 does not generate any error messages.

If the ECU injector FET 14 is in its non-conducting state, no coil current will flow through the third FET 62 and the first diode 54, but coil current still flows through the second diode 66, which is forward biased, and the AIC FET 34, keeping the injector open and supplying fuel to the associated engine cylinder. However, as described above for the circuit shown in FIG. 3, because the AIC FET 34 is conducting, its drain terminal 36 pulls the cathode of the first diode 54 to ground, reverse biasing the diode. Because the first diode 54 is reverse biased during this condition, no current flows through the connecting resistor 52. As a result, the voltage sensed at the ECU injector FET drain terminal 16 remains at the voltage output port value of V+ and the current through the current sensing resistor 20 remains zero, just as they were when the injector FET 14 stopped conducing. Accordingly, the injector will appear to be closed and the ECU 10 will not generate an error code.

To shorten the fuel injection duration, the gate terminals 40 and 70 of both the AIC FET 34 and the third FET 64 are pulled to ground to switch the FET's to their non-conducting state and thereby interrupt the injector coil current $i_c$, stopping fuel flow to the associated engine cylinder. However, the ECU injector FET 14 is still conducting and a current flows through the resistor 52 to the drain 16 of the FET. This current also flows through the current sensing resistor 20. Although the current drawn through the injector FET driver 14 will be significantly lower than $i_c$, the drain terminal voltage $V_D$ will be nearly the same as when the coil 12 is receiving current. Accordingly, the ECU will not generate an error code.

Figure 5:
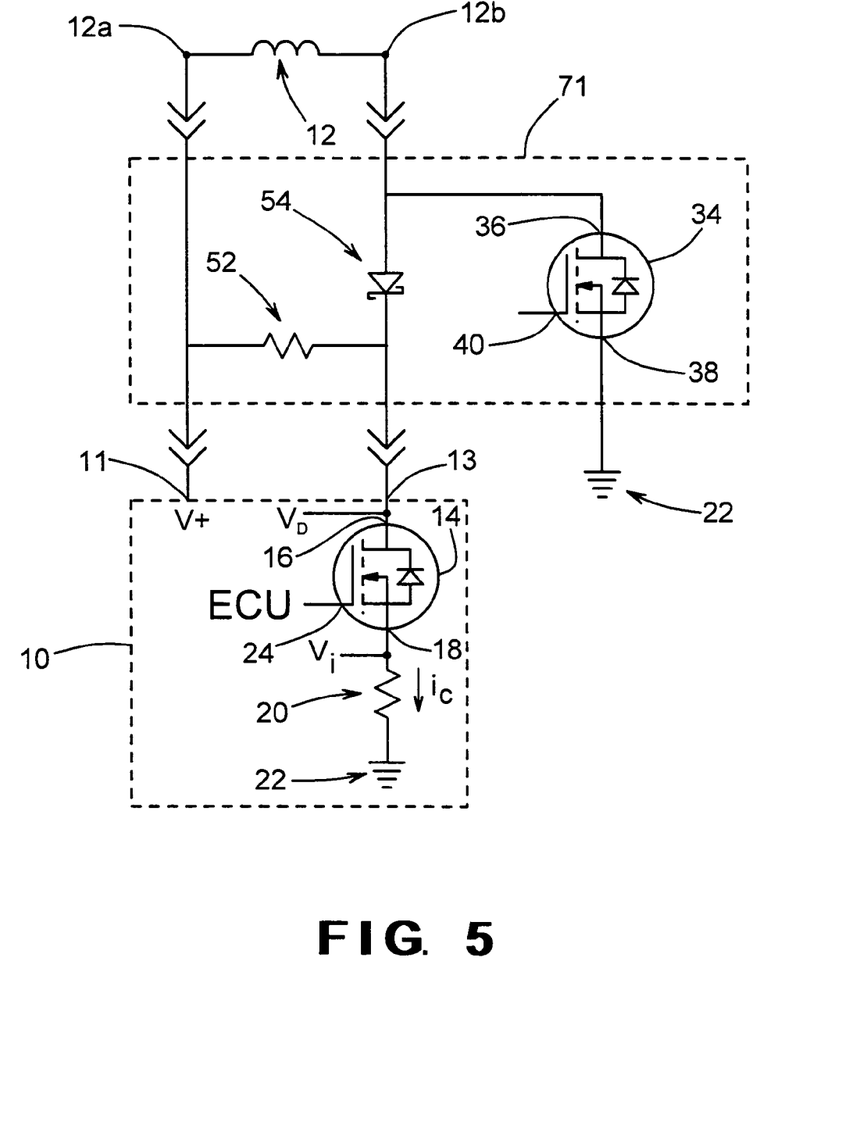
FIG. 5 is an alternate embodiment of the circuit shown in FIG. 3 that includes an Auxiliary Injector Controller.
Figure 6:
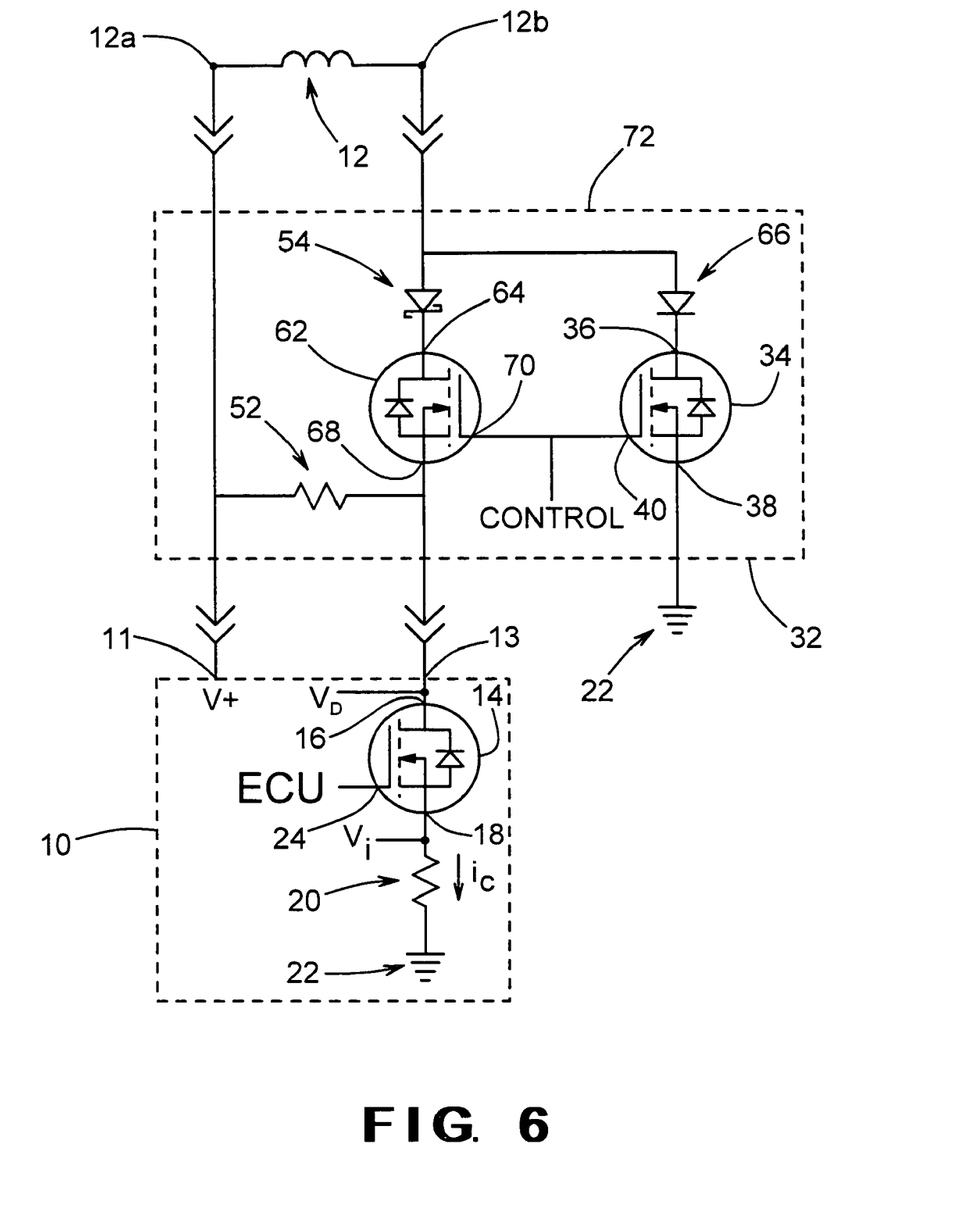
FIG. 6 is an alternate embodiment of the circuit shown in FIG. 4 that includes an Auxiliary Injector Controller.

While the preferred embodiment of the SFITC's 50 and 60 have been illustrated and described as being connected to an ECU 10 and AIC 32, it will be appreciated that the invention also may be practiced with the AIC 32 combined with the SFITC's 50 and 60. In such a case the AIC FET 34 would be included in the supplemental circuit and the resulting circuit would simply be connected between the injector coil 12 and the ECU 10 and provided with a ground connection 22. Such a combined circuit that includes the SFITC 50 shown in FIG. 3 is illustrated by the circuit 71 shown in FIG. 5 where components that are the same as shown in FIG. 3 have the same numerical identifiers. Similarly, AIC 32 also may be combined with the supplemental circuit 60 shown in FIG. 5. Such a combined circuit that includes the SFITC 60 shown in FIG. 4 is illustrated by the circuit 72 shown in FIG. 6 where components that are the same as shown in FIG. 4 have the same numerical identifiers.

An alternate embodiment 74 of the circuit 72 is shown in FIG. 7 where again components that are similar to components shown in the preceding figures have the same numerical identifiers. The circuit 74 is a combined circuit that includes the AIC 32 shown in the earlier circuit in a single circuit that is inserted between the ECU 10 and the fuel injector coil 12 as described above for the embodiments shown in FIGS. 5 and 6. The circuit 74 includes a pair of injector coil ports 76, that are connected to the ends of the injector coil 12. The 74 circuit also includes a voltage input port 78 that is connected to the ECU voltage output port 11 and a voltage output port 80 that is connected to the ECU injector control port 13. Similar to the circuit 50 shown in FIG. 3, the circuit 74 includes a connecting resistor 52 connected across the voltage output port 11 and the injector control port 13 of the ECU 10. The supplemental circuit 50 also includes a diode 54 that has a cathode connected to the ECU injector control port 13. In the preferred embodiment, the diode 54 is a schottky barrier rectifier; however, any rectifier device capable of handling the current and voltage also may be utilized in the circuit. The diode 54 has an anode connected to a source terminal 82 of a first FET 84 that functions to shorten the fuel injector duration. The first FET 84 also has a drain terminal 86 connected to the low end 12$b$ of the injector coil 12 and a gate terminal 88 that receives a shorten duration control signal. The circuit 74 also includes a second FET 90 that functions to lengthen the fuel injection duration. The second FET 90 has a drain terminal 92 connected to the anode of the diode 54. The second FET 90 also has a source terminal 94 connected to ground 22 and a gate terminal 96 that receives a lengthen duration control signal. In the preferred embodiment, the control signals supplied to the FET gate terminals 88 and 96 are generated by a conventional timer circuit (not shown) that is triggered by the ECU 10 when the ECU injector FET 14 is switched to its conducting state. The timer circuit is calibrated for the specific engine modification. Alternately, the control signals supplied to the FET gate terminals 88 and 96 may be generated by a microprocessor (not shown) an Applied Specific Integrated Circuit (ASIC) (not shown), or another similar device.

Figure 7:
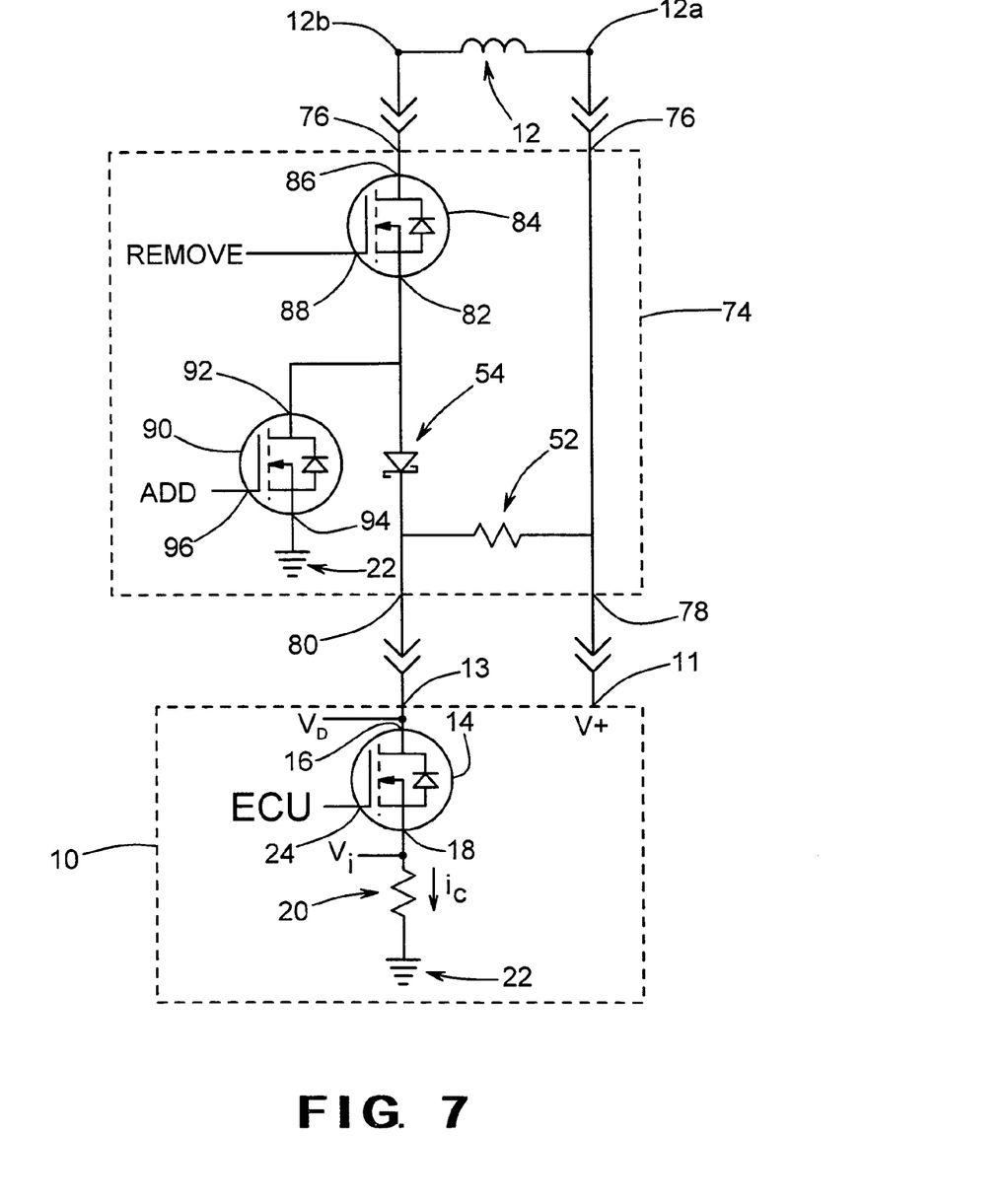
FIG. 7 is an alternate embodiment of the circuit shown in FIG. 6 for either adding or removing fuel.

The operation of the circuit 74 will now be described. Normally, the gate terminal 88 of the first FET 84 is high, causing the FET to be in a conducting state while the gate terminal 96 of the second FET 90 is connected to ground, causing the FET 90 to be in a non-conducting state. When these conditions are met, the ECU 10 operates normally as if the circuit 74 were not present. If it is desired to shorten the fuel injection duration, the gate terminal 88 of the first FET 84 is connected to ground while the gate terminal 96 of the second FET 90 remains connected to ground. As a result, the first FET 84 switches to its non-conducting state and no current flows through the injector coil 12, causing the fuel injector to close. However, similar to the circuit 50 shown in FIG. 3, the resistor 52 supplies current through the ECU FET 14 to the current sensing resistor 20 while the drain voltage $V_D$ is pulled toward ground, preventing the ECU 10 from generating an error signal. Thus, the first FET 84 is used to shorten the fuel injection duration and remove fuel from the associated engine cylinder.

If it is desired to lengthen the fuel injection duration, a control voltage is applied to the gate terminal 96 of the second FET 90 to switch the FET to its conducting state while the gate terminal 88 of the first FET 84 remains high. Thus, both FET's 84 and 96 are in their conducting state and thereby provide an alternate path to ground for the injector coil current after the injector FET 14 is shut off. The resulting current holds the injector open, adding more fuel to the associated engine cylinder. As before, the drain terminal 92 of the second FET 90 pulls the anode of the diode 54 to ground causing the diode 54 to be reverse biased and preventing any current from flowing through the connecting resistor 52 while the drain terminal voltage $V_D$ of the injector FET 14 is pulled to V+. Accordingly, the fuel injector appears closed to the ECU 10 and no error code is generated.

Figure 8:
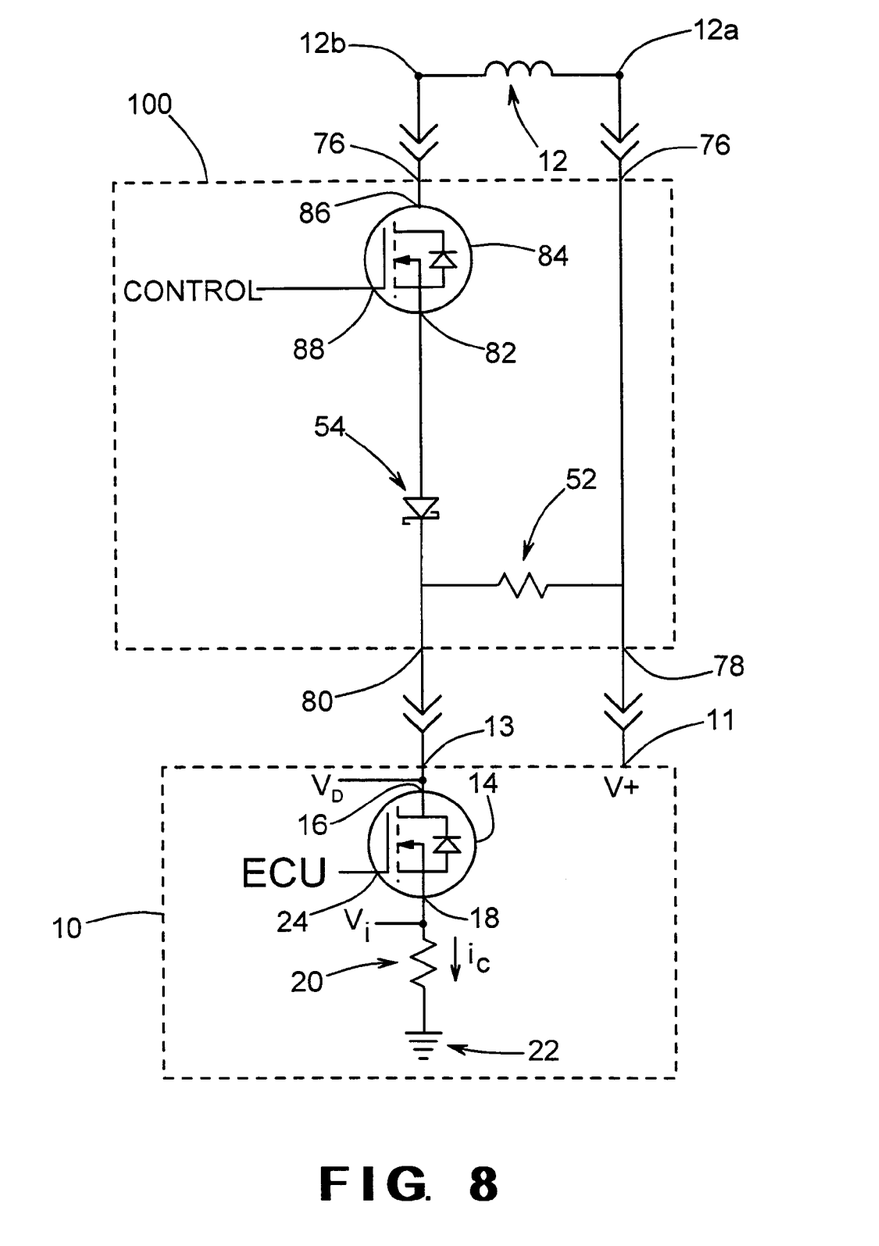
FIG. 8 is an alternate embodiment of the circuit shown in FIG. 7 for removing fuel.

Another alternate embodiment 100 of the invention that is used for removing fuel is shown in FIG. 8 where again components that are similar to components shown in the preceding figures have the same numerical identifiers. The circuit 100 is again a combined circuit that includes the AIC 32 shown in the earlier circuit in a single circuit that is inserted between the ECU 10 and the fuel injector coil 12 as described above for the embodiments shown in FIGS. 5 and 6. The circuit 100 is similar to the circuit 74 shown in FIG. 7, but with the second FET 90 deleted. Similar to the circuit 74, the single FET 84 is inserted between the low end 12b of the injector coil 12 and the cathode of the diode 54. While a schottky barrier rectifier is shown in FIG. 8 for the diode 54, it will be appreciated that the invention may be practiced utilizing any rectifier device capable of handling the current and voltage. As before, in the preferred embodiment, the control signal supplied to the FET gate terminal 88 is generated by a conventional timer circuit (not shown) that is triggered by the ECU 10 when the ECU injector FET 14 is switched to its conducting state. Alternately, the control signals supplied to the FET gate terminal 88 may be generated by a microprocessor (not shown), an Applied Specific Integrated Circuit (ASIC) (not shown), or another similar device.

The operation of the circuit 100 will now be described. Normally, the control input is maintained high, causing the FET 84 to be in its conducting state while the ECU 10 operates normally. To shorten the fuel injection duration, the FET gate terminal 88 is pulled to ground, causing the FET 84 to switch to its non-conducting state and blocking current flow through the injector coil 12, thereby closing the fuel injector. However, as described for the operation of the circuit 50, shown in FIG. 3, the resistor 52 continues to supply current to the injector FET 14. Accordingly, a voltage $V_i$ appears across the current detecting resistor 20 and the drain voltage $V_D$ is pulled toward ground. As a result, the injector appears to continue to be open and no error code is generated.

The invention also contemplates modifying the circuit shown in FIG. 8 by inserting an inverter (not shown) between the control signal and the gate terminal 88 of the FET 84. The modified circuit would then normally have the gate 88 high for no input signal, causing the FET 84 to be in its conducting state. The circuit would then be actuated to shorten the fuel injection duration by a high control signal, that would cause the gate to be pulled to ground, switching the FET 84 to its non-conducting state.

Another alternate embodiment 110 of the circuit 71 for adding fuel to a lean mixture is shown in FIG. 9 where again components that are similar to components shown in the preceding figures have the same numerical identifiers. The circuit 110 is a combined circuit that again includes the AIC 32 shown in the earlier circuit in a single circuit that is inserted between the ECU 10 and the fuel injector coil 12 as described above for the embodiments shown in FIGS. 5 and 6. The circuit 110 includes a pair of injector coil ports 76, that are connected to the ends of the injector coil 12. The circuit 110 also includes a voltage input port 78 that is connected to the ECU voltage output port 11 and a voltage output port 80 that is connected to the ECU injector control port 13. Similar to the circuit 50 shown in FIG. 3, the circuit 110 includes a connecting resistor 52 connected across the voltage output port 11 and the injector control port 13 of the ECU 10. The supplemental circuit 110 also includes a diode 54 that has a cathode connected to the ECU injector control port 13. In the preferred embodiment, the diode 54 is a schottky barrier rectifier; however, any rectifier device capable of handling the current and voltage also may be utilized in the circuit. The diode 54 also has an anode connected to both the low end 12b of the injector coil 12 and a drain terminal 36 of a supplemental FET 34 that functions to lengthen the fuel injection duration. The supplemental FET 34 also has a source terminal 38 connected to ground 22 and a gate terminal 40 that receives a lengthen duration control signal. The circuit 110 also includes a Zenier diode 112 having a cathode connected to supplemental FET drain terminal 36 and an anode connected to a drain terminal 114 of a clamping FET 116. The clamping FET 116 has a source terminal 118 connected to ground 22 and a gate terminal 220 that receives a clamping signal. The clamping FET 116 co-operates with the Zenier diode 112 to apply a clamping voltage to the negative terminal 12b of the injector coil 12. In the preferred embodiment, the control signals supplied to the FET gate terminals 40 and 120 are generated by a microprocessor (not shown) that is triggered by the ECU 10 when the ECU injector FET 14 is switched to its conducting state; however, other means, such as, for example, a conventional timing circuit or ASIC also may be utilized to control the FET's 34 and 116. When utilized, the microprocessor is programmed for the specific engine modification.

Figure 9:
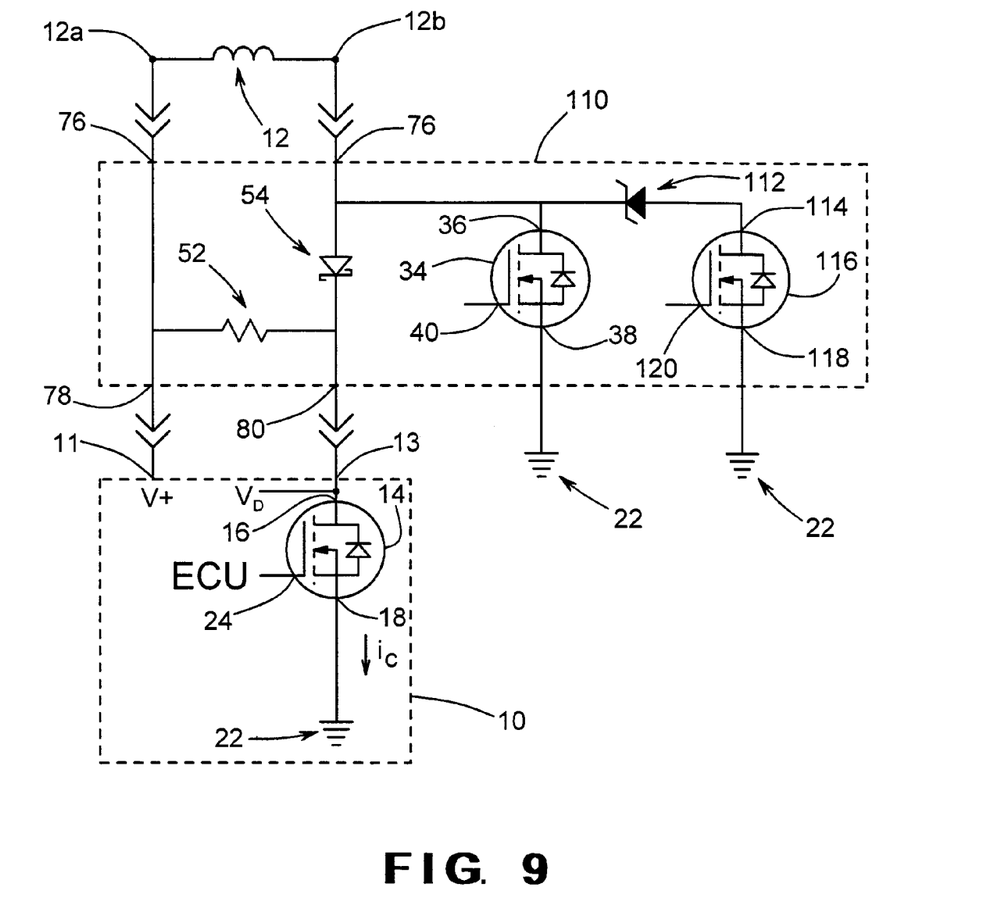
FIG. 9 is another alternate embodiment of the circuit shown in FIG. 5 for adding fuel.
Figure 10:
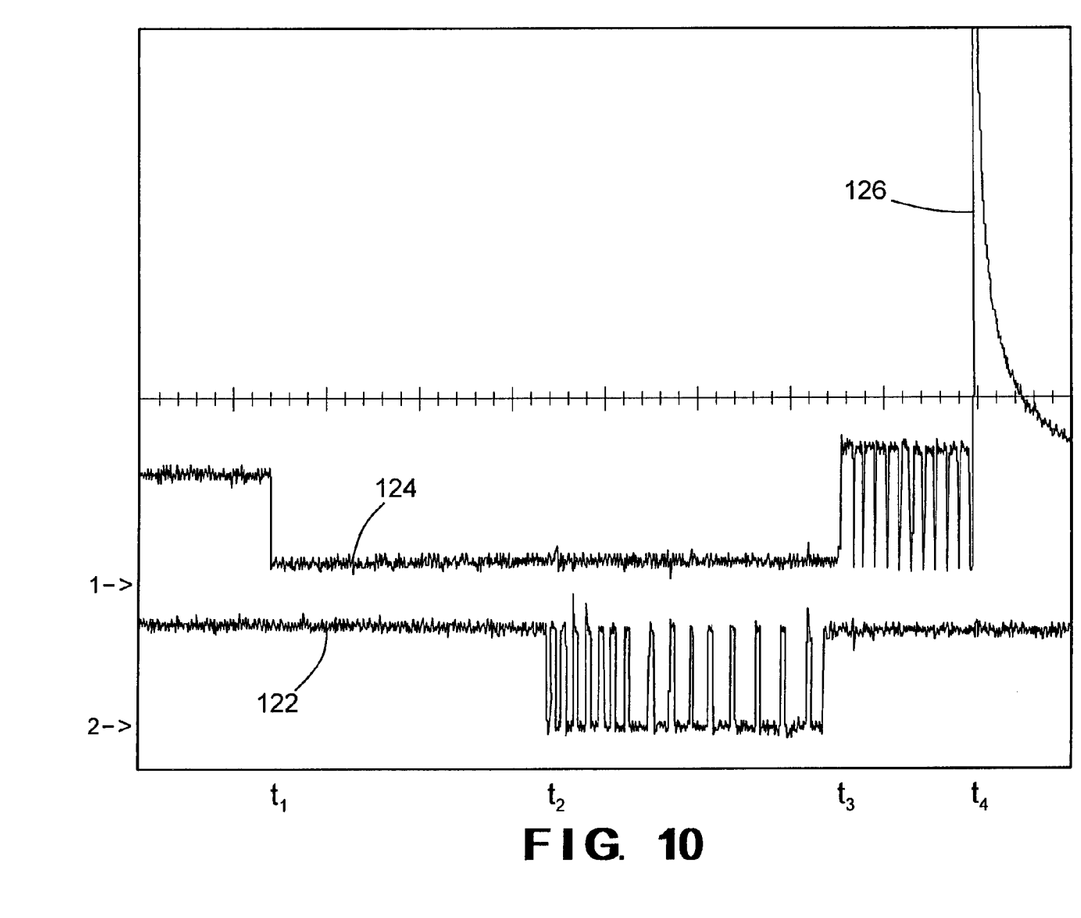
FIG. 10 illustrates voltages resulting from the operation of the circuit shown in FIG. 9.

The operation of the circuit 110 will now be explained with the voltage waveforms shown in FIG. 10. In FIG. 10, the lower curve, which is labeled 122 represents the voltage appearing at the positive end 12a of the injector coil 12 connected to the ECU voltage supply V+ while the upper curve, which is labeled 124 represents the voltage appearing at the negative end 12b of the injector coil 12 that is connected through the ECU FET 14 to ground 22. At time $t_1$ the ECU FET 14 is turned on to energize the injector coil 12 to begin fuel delivery to the engine. Accordingly, the voltage at the negative 12b end of the coil 12 is pulled to ground. In the preferred embodiment, both the supplemental FET 34 and the clamping FET 116 also are placed in their conducting states at $t_1$; however, the FET's 34 and 116 may be energized later, provided that the energization occurs before the ECU FET 14 is turned off. The ECU shown in FIG. 9 is intended for use on a snow mobile which does not have a battery but provides electrical energy from an engine driven alternator or generator. Accordingly, at $t_2$, the ECU begins providing a Pulse Width Modulated voltage to the injector coil 12 to prevent the injector coil current draw from pulling down the voltage supply. If the supplemental FET 34 is energized, a PWM voltage is also applied to the gate terminal 40 at this time. Typically, the ECU includes a clamping circuit (not shown) on the positive side of the unit to maintain the voltage supply; however, the ECU clamp is exceeded by the clamp voltage provided by the clamp FET 116 and thus does not appear in FIG. 10. Additionally, the injector coil current is sampled on the positive side of the ECU (not shown). At $t_3$, the ECU fuel injection cycle ends and the ECU FET 14 reverts to its non-conducting state. However, the supplemental FET 34 and the clamp FET 116 remain in their conducting states with the supplemental FET 34 being supplied with a PWM gate signal, as shown in extended injection time between $t_3$ and $t_4$ in FIG. 10. As described above, the resistor 52 and the diode 54 co-operate to prevent the ECU 10 from generating a false error code due to the extended duration of the fuel injection cycle. The clamping FET 116 co-operates with the Zenier diode 112 to prevent collapse of the magnetic field within the injector coil 12 allowing continued operation of the fuel injector. At $t_4$, the supplemental and clamping FET's 34 and 116 are switched to their non-conducting states, interrupting the current supplied to the injector coil 12 and closing the injector. As shown in FIG. 10, a large voltage spike 126 results from the collapse of the magnetic field in the injector coil 12.

Figure 11:
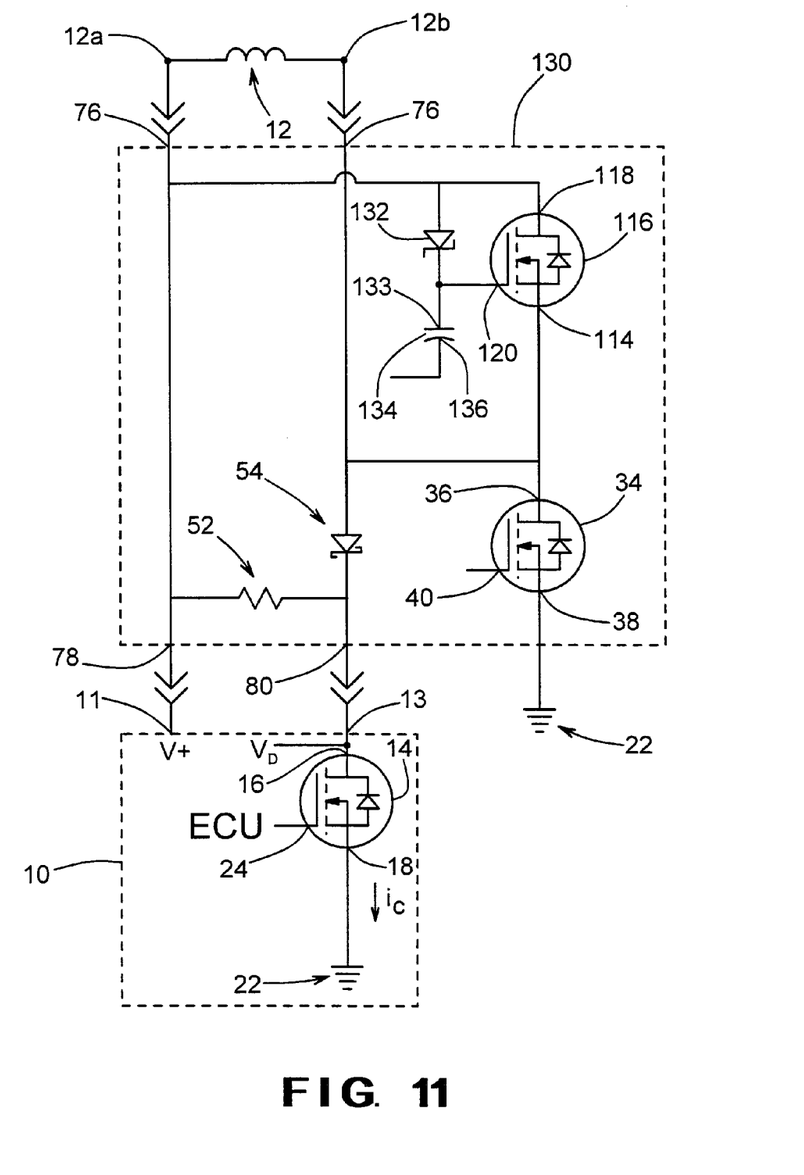
FIG. 11 is an alternate embodiment of the circuit shown in FIG. 9.

An alternate embodiment of the circuit 110 is shown generally at 130 in FIG. 11 where components that are similar to components shown in FIG. 110 have the same numerical identifiers. In FIG. 11, the clamping FET drain terminal 114 is again connected to the drain of the supplemental FET 34; however, the clamping FET source terminal 118 is connected to the voltage supply V+. Also, the clamping FET gate terminal 120 is connected to both the cathode of a diode 132 and a first end 133 of a capacitor 134. The anode of the diode 132 is also connected to the voltage supply V+ while the clamping signal is applied to a second end 136 of the capacitor 134. In the preferred embodiment, the clamping signal and the control signal to the supplemental FET gate terminal 40 are supplied by a microprocessor (not shown); however other control means, such as, for example, a conventional timing circuit or an ASIC also may be utilized. In the preferred embodiment, the diode 132 is a schottky barrier rectifier; however, any rectifier device capable of handling the current and voltage also may be utilized in the circuit.

The operation of the circuit 130 will now be described. When the clamping signal is at ground, the capacitor 134 charges to the supply voltage V+. Then, when the clamping signal goes high, the capacitor voltage is added to the clamping signal and the total is applied to the clamping FET gate terminal 120 turning on the clamping FET 116 and pulling the clamp to voltage supply V+. Other than the different clamping action, the operation of the circuit 130 proceeds as described above for circuit 110; however, less energy is used.

While the preferred embodiment of the circuits 110 and 130 has been described above for use on a snowmobile engine, it will be appreciated that the circuits 110 and 130 also may utilized on engines for other conveyances, including engines having a battery and charging system.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the circuits have been described for utilization on motorcycles and snow mobiles, the circuits also may be utilized on water jet skis, all terrain vehicles and other engine powered conveyances.

What is claimed is:

1. A supplemental fuel injector trigger circuit comprising:
   a voltage control device having a first end adapted to be connected to a voltage supply, said voltage control device also having a second end adapted to be connected to a first electronic switch, said voltage control device operative to apply a voltage to said first electronic switch when said first electronic switch is non-conducting;
   a current control device having a first end adapted to be connected to said first electronic switch and a second end adapted to be connected to a first end of a fuel injector coil with a second end of said fuel injector coil being connected to a voltage supply, said current control device operative to block current flow therethrough when said first electronic switch is non-conducting; and
   a second electronic switch connected between said second end of said current control device and ground, said second electronic switch selectively operable to allow current to flow through said fuel injector coil to ground.

2. The supplemental fuel injector trigger circuit according to claim 1 wherein said voltage control device is a resistor.

3. The supplemental fuel injector trigger circuit according to claim 2 wherein said current control device is a diode, said diode having a cathode adapted to be connected to said first electronic switch and an anode connected to said one end of said fuel injector coil.

4. The supplemental fuel trigger circuit according to claim 3 wherein said second electronic switch is a field effect transistor having a drain terminal connected to said diode anode and a source terminal connected to ground, said field effect transistor also having a gate terminal that receives a control signal for switching said field effect transistor between conducting and non-conducting stages.

5. The supplemental fuel trigger circuit according to claim 4 wherein said first electronic switch is a field effect transistor that is included in an engine control unit.

6. The supplemental fuel circuit according to claim 5 wherein said voltage supply connected to said resistor first end also is connected to said second end of said fuel injector coil.

7. The supplemental fuel circuit according to claim 6 wherein said voltage supply is a voltage output port of an Engine Control Unit.

8. The supplemental fuel injector trigger circuit according to claim 3 wherein said diode is a schottky barrier rectifier.

9. The supplemental fuel injector trigger circuit according to claim 5 further including a timer circuit connected to said field effect transistor gate terminal, said timer circuit being operative upon current being supplied to said fuel injector coil to generate first and second signals and apply said first and second signals to said field effect transistor gate terminal with said field effect transistor being responsive to said first signal applied to switch to said conducting state and to said second signal being to switch to said non-conducting state.

10. A supplemental fuel injection circuit comprising:
   a resistor having a first end adapted to be connected to a voltage supply, said resistor also having a second end adapted to be connected to a first electronic switch, said resistor operative to apply a voltage to said first electronic switch when said first electronic switch is non-conducting;
   a diode having an anode and cathode, said diode cathode adapted to be connected to said first electronic switch and said diode anode adapted to be connected to a first end of a fuel injector coil with a second end of said fuel injector coil being connected to a voltage supply, said diode operative to block current flow therethrough when said first electronic switch is non-conducting; and
   a second electronic switch having an input port and an output port with said input port connected to said diode anode and said output port connected to ground, said electronic switch also having a control port with said electronic switch being responsive to a first signal applied to said control port to conduct current between said input and output ports, said electronic switch also being responsive to a second signal being applied to said control port to block current from flowing between said input and output ports.

11. The supplemental fuel injection circuit according to claim 10 wherein said second electronic switch is a field effect transistor having a drain terminal connected to said diode anode of said diode and a source drain terminal connected to ground.

12. The supplemental fuel injector trigger circuit according to claim 11 wherein said electronic switch is a Field Effect Transistor having a source terminal adapted to be connected to said Engine Control Unit fuel injector control port, said Field Effect Transistor also having a drain terminal connected to said cathode of said first diode and a gate terminal that is adapted to be connected to said control port of said Auxiliary Fuel Injector Controller.

13. The supplemental fuel injector trigger circuit according to claim 12 wherein said second diode is a silicon rectifier.

14. The supplemental fuel injection circuit according to claim 11 wherein said field effect transistor has a gate terminal and further wherein the circuit includes a timer circuit connected to said gate terminal, said timer circuit being operative upon current being supplied to said fuel injector coil to generate said first and second signals and apply said first and second signals to said field effect transistor gate terminal.

15. The supplemental fuel injection circuit according to claim 14 wherein said diode is a schottky barrier rectifier.

16. The supplemental fuel trigger circuit according to claim 14 wherein said field effect transistor is a first field effect transistor and further wherein said first electronic switch is a second field effect transistor that is included in an engine control unit.

17. The supplemental fuel circuit according to claim 16 wherein said voltage supply connected to said resistor first end also is connected to said another end of said fuel injector coil opposite from said first end.

18. The supplemental fuel circuit according to claim 17 wherein said voltage supply is a voltage output port of an Engine Control Unit.

* * * * *